May 19, 1925.  C. H. BRASELTON  1,537,983
SPRING SUSPENSION FOR VEHICLES
Filed Dec. 30, 1920  3 Sheets-Sheet 1
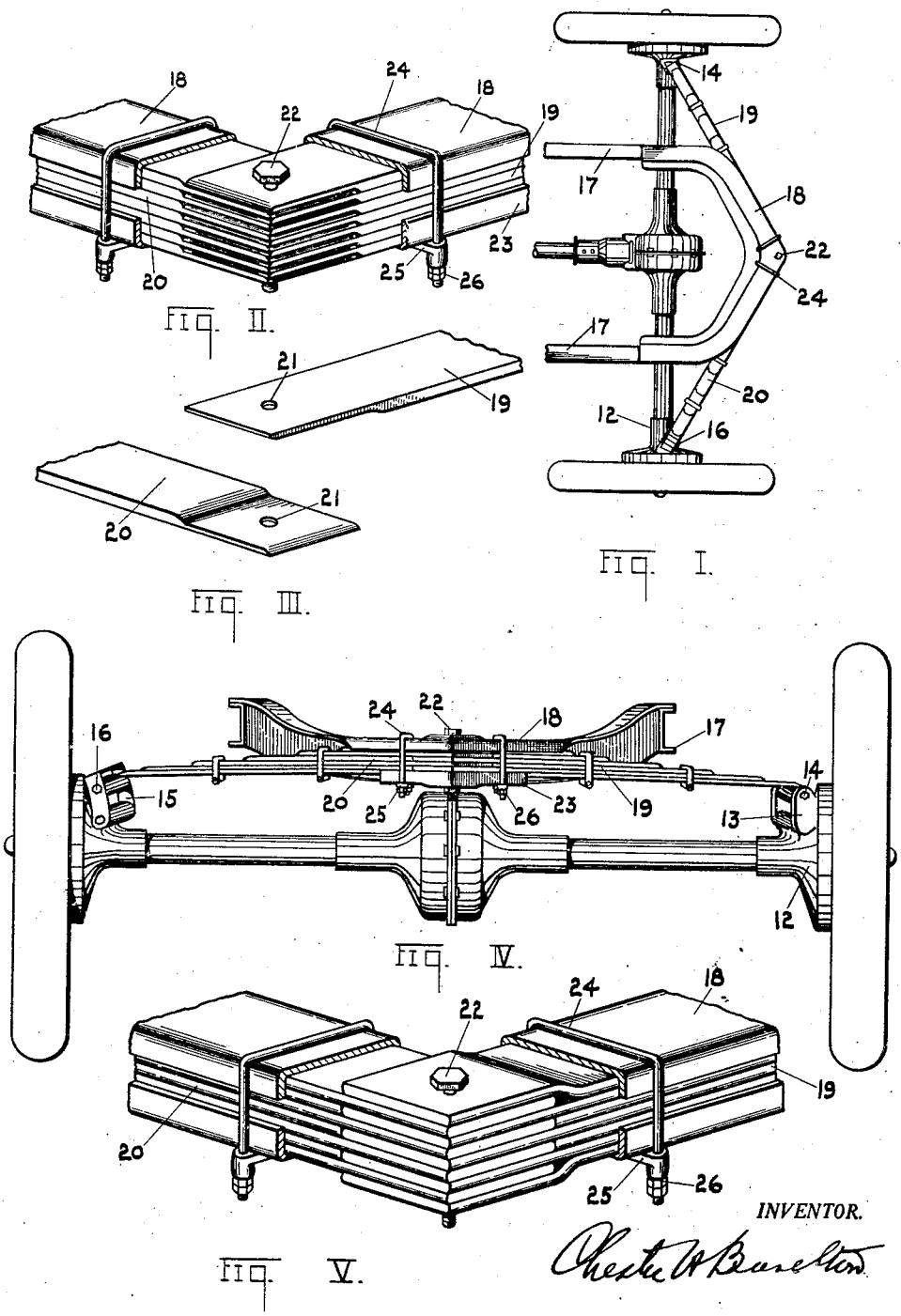
INVENTOR.
Chester H Braselton

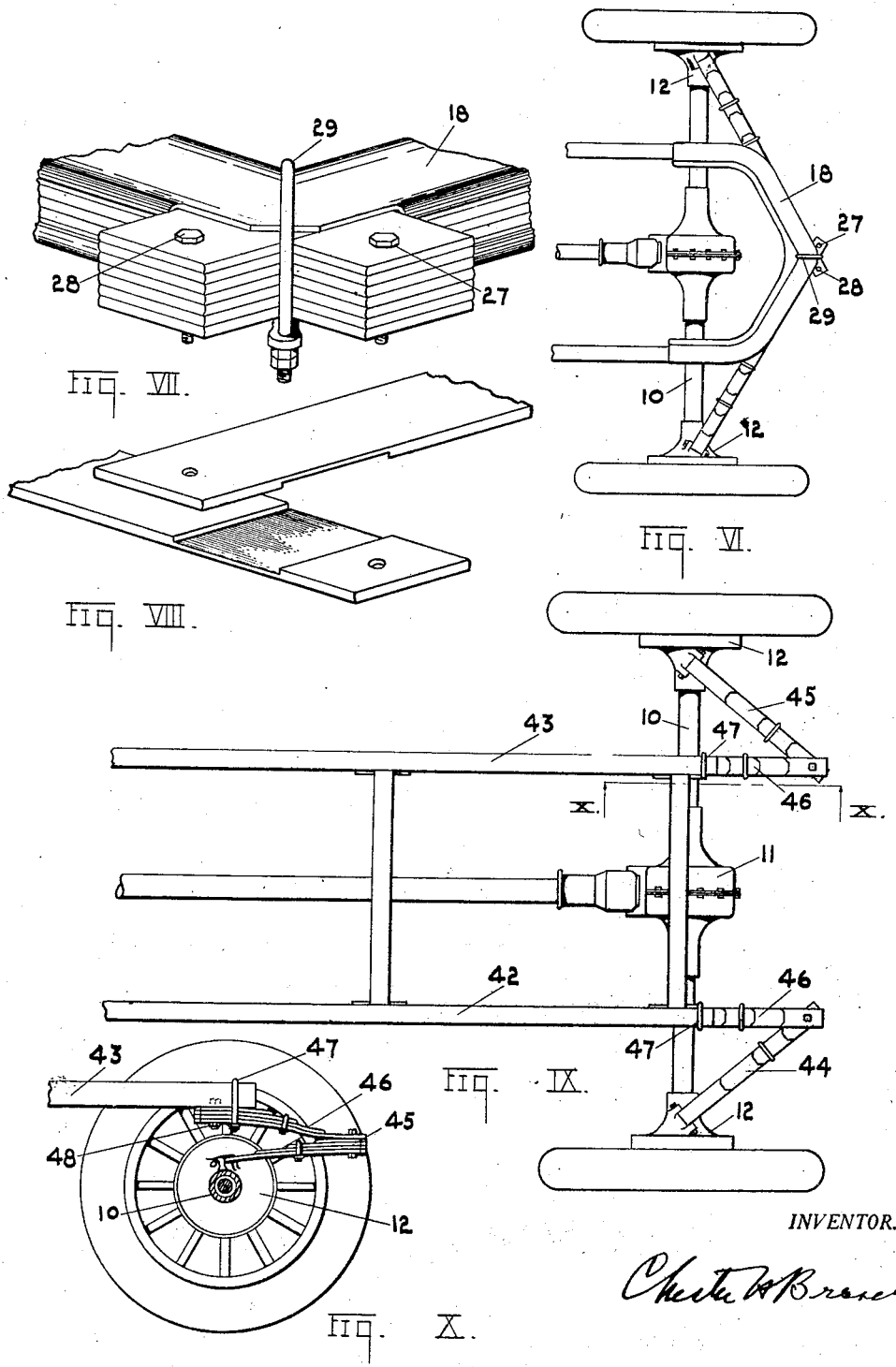

May 19, 1925.
C. H. BRASELTON
1,537,983
SPRING SUSPENSION FOR VEHICLES
Filed Dec. 30, 1920    3 Sheets-Sheet 3
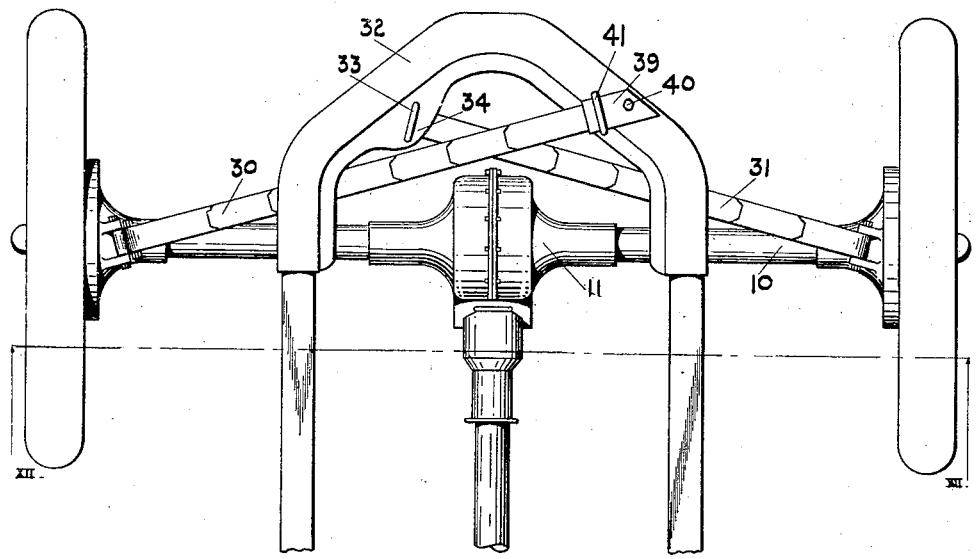
Fig. XI.
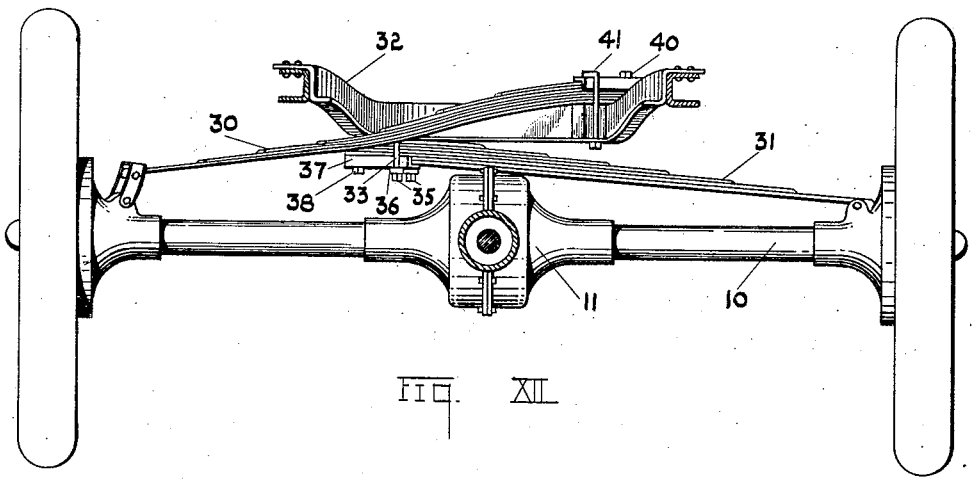
Fig. XII.
INVENTOR.

Patented May 19, 1925.

1,537,983

UNITED STATES PATENT OFFICE.

CHESTER H. BRASELTON, OF NEW YORK, N. Y., ASSIGNOR TO THE WILLYS-OVERLAND COMPANY, OF TOLEDO, OHIO, A CORPORATION OF OHIO.

SPRING SUSPENSION FOR VEHICLES.

Application filed December 30, 1920. Serial No. 434,031.

*To all whom it may concern:*

Be it known that I, CHESTER H. BRASELTON, a citizen of the United States, residing at New York, in the county of New York and State of New York, have invented certain new Improvements in Spring Suspensions for Vehicles, of which I declare the following to be a full, clear, and exact description.

This invention relates to improvements in spring suspension for vehicles, primarily for motor vehicles.

One of the objects of the invention is the attachment of the butt ends of a pair of springs to a vehicle frame in such manner as to make effective substantially the entire length of each spring. This is accomplished in one instance by employing but a single means for holding together the leaves of the two springs, whereby the means for clamping the springs to the frame may be brought closer together than would be possible were the butt ends of the springs separated and the several leaves of each spring held together by a separate fastening. The same object is accomplished in another instance by crossing the two springs, preferably by interweaving their respective leaves, and by securing the two springs to the frame at the intersection of the springs.

Objects relating to details of construction and economies of manufacture, and other objects, will appear as I proceed with the description of that embodiment of the invention which, for the purpose of the present application, I have illustrated in the accompanying drawing, in which:

Figure I is a fragmental plan view of the rear portion of an automobile chassis embodying my invention.

Figure II is a detail perspective view with part of the frame broken away showing one means for securing together the respective leaves of each spring.

Figure III is a detail perspective view showing the halved ends of adjacent leaves, one from each spring.

Figure IV is an end elevation showing a modified form of the invention.

Figure V is a perspective view showing in detail the meeting portions of the springs in the modification of Figure IV.

Figure VI is a view similar to Figure I, but of another modification.

Figure VII is a fragmental perspective view showing the fastenings for the butt ends of the springs illustrated in Figure VI.

Figure VIII is a detail perspective showing two adjacent leaves from the two springs illustrated in Figures VI and VII.

Figure IX is a plan view of the rear end of a vehicle in which a further modification is employed.

Figure X is a section taken substantially on the line 10—10 of Figure IX.

Figure XI is a fragmentary plan view of a vehicle embodying still another modification of the invention.

Figure XII is a transverse horizontal section taken substantially on the line 12—12 of Figure XI.

Like reference characters in the several views relate to similar parts.

In the drawings, 10 represents the rear axle casing of an automobile, comprising a differential housing 11 and supporting at its outer end, castings 12. One of these castings includes an integral part 13 in which is mounted a pivot pin 14 upon which the small end of one of the cantilever springs is mounted. The other casting 12 has pivoted thereto a shackle 15 carrying a pivot pin 16 upon which the small end of the other spring is mounted. The side bars of the frame are indicated at 17 and have attached to their ends by any suitable means a pressed connector 18 which is roughly Z-shaped in cross section and the transverse portion of which is preferably made up of two parts meeting in the middle at an angle. In the form of the invention illustrated in Figures I to VIII inclusive, two cantilever springs 19 and 20 lie beneath the upper flange of the connector 18 at the middle thereof and are secured to the said connector as near the middle as is conveniently possible.

Referring to Figures I, II and III, each of the springs 19 and 20 is shown as made up of a series of leaves which at their inner ends are halved as shown, whereby the leaves of one spring may be interwoven with the leaves of the other spring, making the tops and bottoms of the springs flush. All of the leaves of each pair have aligned openings 21 through which a bolt 22 extends. This bolt may also extend through the connector 18 and through an under bridging piece 23 of channel form. The bolt 22 may therefore be of assistance in securing the springs to the frame member 18. The principal means employed for this purpose, however, consists of U-bolts 24 which embrace the frame member 18 with the springs and the channel member 23, the arms of the bolts extending through a transverse bar 25 which is caused to grip the under surface of the channel 23 when the nuts 26 are tightened. The portions of the two springs which lie between these U-bolts are clamped tightly to the frame and therefore are not effective in absorbing shocks, the effective portions lying between the U-bolts and the pivot pins 14 or 16, as the case may be.

In Figures IV and V, the interengaging leaves of the springs are not halved. Every alternate leaf of spring 20 is terminated short of the remaining leaves by a distance equal approximately to the width of the leaves. The outer leaves of the spring 19 are offset at their ends so as to be spaced from the next adjacent leaves a distance equal to the thickness of one leaf, while every other one of the remaining leaves is shortened as in the case of the spring 20. The projecting ends of the respective springs are interleaved and provided with aligned perforations through which a bolt 22 extends as in the above described form of the invention. The horizontal flange of the frame member 18 must be offset at the middle, a distance equal to the thickness of one spring leaf, and a similar offset must be provided in the channel 23. In other respects this form of the invention is like that first described.

In the modification illustrated in Figures VI, VII and VIII, one U-bolt only is sufficient to tie the springs to the frame, and the springs are effective along the entire distance from one end of the axle to the other. In this modification the leaves of the two springs are halved, not at their ends, but at a short distance inward from their ends, as shown in Figure VIII. The ends of each spring beyond the halved portions are provided with elongated perforations through which are extended bolts 27 and 28. When the nuts upon these bolts are tightened the several leaves of each spring are bound together and at the same time the bolts in combination with the shoulders formed by the halved portions serve to bind together the two springs. The springs are then secured to the frame member 18 by a single U-bolt 29.

In Figures XI and XII, the butt ends of the springs 30 and 31 are not clamped to the very end of the frame, but extend beyond the median line of the frame and hence overlap. The spring 31 is bound to the underside of the frame member 32 by a U-bolt 33, the ends of which extend through perforations in an enlargement 34 of the lower flange of the frame member provided for the purpose. The nuts 35 on the U-bolt engage a cross-piece 36 which in turn bears upon a channel 37 extending beneath the spring and for a short distance up the sides thereof. A bolt 38 extends through this channel and through aligned perforations in the leaves of the spring. The other spring 30 is curved so as to extend beneath the frame on the side nearest its connection with the axle but above the frame at its butt end, it being joined to the frame member 32 above the top flange thereof. A channel plate 39 is placed above the spring and a bolt 40 projects therethrough and through aligned perforations in the leaves of the spring as well as through the upper flange of the frame member 32. In addition the spring is clamped to the frame by a U-bolt 41 having one arm extending through the lower flange of the frame member and having the other arm extending through the upper flange of the frame member.

In the modification illustrated in Figures IX and X, the construction of the frame is that ordinarily employed in automobiles. The springs 44 and 45 have their butt ends connected to the rear ends of the side frame bars 42 and 43 respectively or to a spring extension 46 thereof. The side bars, or their extensions, terminate at a distance in the rear of the axle so that the springs 44 and 45 must extend forward diagonally. The spring extensions 46 may be secured at their butt ends to the rear ends of the bars 42, 43 in any suitable manner, that shown herein being by means of U-bolts 47 surrounding the bars and springs and also by means of bolts 48 extending through the leaves of the spring and through the lower flange of the frame member. The connection between the rear end of each of the extensions 46 and the springs 44, 45 is illustrated as a simple bolt, but it should be understood that other means for the purpose are within the spirit of this invention. When the extensions 46 are employed, this modification of my invention provides great resiliency and also accomplishes other results attained by the form of spring mounting illustrated generally in the other views, which has come to be known in the art as a "triplex" spring mounting.

While I have described my invention more or less in detail as being embodied in certain forms, I do not desire to be limited thereto as, on the contrary, my invention contemplates broadly all the proper changes in the form, construction and arrangement as well as the omission of immaterial elements and the substitution of equivalents therefor, that circumstances may suggest or necessity render expedient.

Having thus described my invention, what I claim as new and desire to secure by Letters Patent, is:

1. In a vehicle, a frame, an axle arranged below said frame at an appreciable distance inwardly from one end thereof, a pair of cantilever springs having their small ends mounted upon said axle, the large or butt ends of the springs being overlapped and attached to the end of the frame in such manner as to make substantially the entire length of the springs effective.

2. In a vehicle, a frame, an axle, a pair of cantilever springs having their free ends attached to opposite ends of said axle, the large ends of said springs being joined together in a manner to form a continuous spring from one end of the axle to the other, and means for tying said joined ends to the frame.

3. In a vehicle, a frame, an axle, a pair of cantilever springs each consisting of a plurality of leaves, said springs having their free ends attached to opposite ends of said axle, said frame being extended an appreciable distance beyond the axle and means for joining together the leaves of each spring at their butt ends and for joining said butt ends together and to the extended portion of the frame at a point adjacent the center thereof and rearwardly of the axle.

4. In a vehicle, a frame, a pair of cantilever springs each built up of a plurality of leaves, and a single means for joining together the leaves of each spring, for joining the butt ends of the two springs and for joining both springs to the frame.

5. In a vehicle, a frame, a pair of cantilever springs each built up of a plurality of leaves certain leaves of one spring being interposed relative to leaves of the other spring at the butt ends of the springs, means for connecting the two butt ends together, said means also serving to join together the several leaves of each spring, and means for securing the joined springs to the frame at their point of junction.

6. In a vehicle, a frame, a pair of cantilever springs each built up of a plurality of leaves, certain leaves at the butt end of one spring interengaging with certain leaves at the butt end of the other spring, and means for fastening the leaves of each spring together at the butt end of the spring, for fastening the said butt ends to each other, and for fastening the two springs to the frame at said butt ends.

7. In a vehicle, a frame, a pair of cantilever springs each built up of a plurality of leaves, the leaves of one spring at its butt end being inter-leaved with the leaves of the other spring at its butt end, said leaves being halved at their intersections, means for securing said springs together, and means for securing said springs to the frame.

8. In a vehicle, a frame, a pair of cantilever springs each built up of a plurality of leaves, the leaves of one spring at the butt end thereof interengaging with the leaves of the other spring at the butt end thereof, a common securing means for holding in place each leaf of each spring at the point of juncture of the springs, and clamping means upon either side of said securing means for clamping each spring to the frame.

9. In a vehicle, a frame, a pair of cantilever springs each built up of a plurality of leaves, the leaves of one spring at the butt end thereof interengaging with the leaves of the other spring at the butt end thereof, a bolt extending through all of the leaves of each spring at their junction point, and a clamp upon either side of said bolt for clamping each spring to the frame.

10. In a vehicle, a frame having an angular portion, a pair of cantilever springs each built up of a plurality of leaves, the leaves of one spring crossing those of the other spring near the butt end at an angle corresponding to that of said angular portion of the frame, the intersecting portions of the leaves being halved, means for fastening together the leaves of each spring beyond the said halved portions, and clamping means for securing the intersecting portions of said springs to the angular portion of said frame.

11. In a vehicle, an axle, a frame including side members and a transverse connecting member having its middle portion extending beyond the axle, a pair of convergently arranged cantilever springs having their outer ends connected with the axle, the leaves of the springs at their opposite ends interengaging one with another, and means at the point of inter-engagement securing said springs to said transverse connecting member.

12. In a vehicle, an axle, a frame including side members and a transverse connecting member having its middle portion extending beyond the axle, a pair of convergently arranged cantilever springs having their outer ends connected with the axle, the leaves of the springs at their opposite ends inter-engaging one with another, and means connecting said inter-engaging ends and adapted also to connect the same with said transverse connecting frame member.

In testimony whereof, I affix my signature.

CHESTER H. BRASELTON.